(12) United States Patent
Burkhauser

(10) Patent No.: US 7,972,044 B2
(45) Date of Patent: Jul. 5, 2011

(54) HORTICULTURAL LIGHT FIXTURE WITH ADJUSTABLE AIR CIRCULATION VENT HOLE COVER AND ADJUSTABLE LIGHT SOCKET ASSEMBLY

(76) Inventor: Peter J. Burkhauser, Middletown, CA (US)

( * ) Notice: Subject to any disclaimer, the term of this patent is extended or adjusted under 35 U.S.C. 154(b) by 173 days.

(21) Appl. No.: 12/467,221

(22) Filed: May 15, 2009

(65) Prior Publication Data
US 2009/0310373 A1  Dec. 17, 2009

Related U.S. Application Data

(60) Provisional application No. 61/053,631, filed on May 15, 2008.

(51) Int. Cl.
*F21V 29/00* (2006.01)
(52) U.S. Cl. .................. 362/373; 362/218; 362/294
(58) Field of Classification Search ............... 362/217.1, 362/373, 362, 294, 218, 1, 2, 149
See application file for complete search history.

(56) References Cited

U.S. PATENT DOCUMENTS

| | | | |
|---|---|---|---|
| 4,449,166 A | 5/1984 | Sharp | |
| 4,654,757 A * | 3/1987 | Birkhauser | 362/503 |
| 6,247,830 B1 | 6/2001 | Winnett et al. | |
| 6,435,699 B2 | 8/2002 | Glowach, Sr. | |
| 6,595,662 B2 | 7/2003 | Wardenburg | |
| 7,175,309 B2 | 2/2007 | Craw | |
| 2002/0141195 A1* | 10/2002 | Peter | 362/362 |
| 2004/0240214 A1* | 12/2004 | Whitlow et al. | 362/373 |
| 2008/0205071 A1* | 8/2008 | Townsley | 362/373 |
| 2009/0116250 A1* | 5/2009 | Hargreaves et al. | 362/373 |

* cited by examiner

*Primary Examiner* — Laura Tso
(74) *Attorney, Agent, or Firm* — Craig M. Stainbrook; Stainbrook & Stainbrook, LLP

(57) ABSTRACT

A light fixture for use as a horticultural and agricultural grow light fixture, which includes a fixture housing, end panels disposed in the open ends of the housing, each of which includes a duct opening and a duct connector disposed in the duct opening. A specular insert is installed in the interior of the fixture housing and includes sides spaced apart from the sides of the fixture housing such that a cooling and insulating airspace is defined between the specular insert and the housing. Both the housing and specular insert are mounted on a base, and the fixture bottom opening is covered by a lens. In the preferred embodiment, an adjustable light socket assembly is positioned in one of the duct connectors. Finally, the assembly includes a adjustable vent hole cover mounted in each of the duct connectors. The vent hole covers can be adjusted between a fully open position and a fully closed position, such that when the duct connectors are connected to an air circulation system, the rate and volume of air flow to and within the interior of the light fixture can finely adjusted.

8 Claims, 9 Drawing Sheets

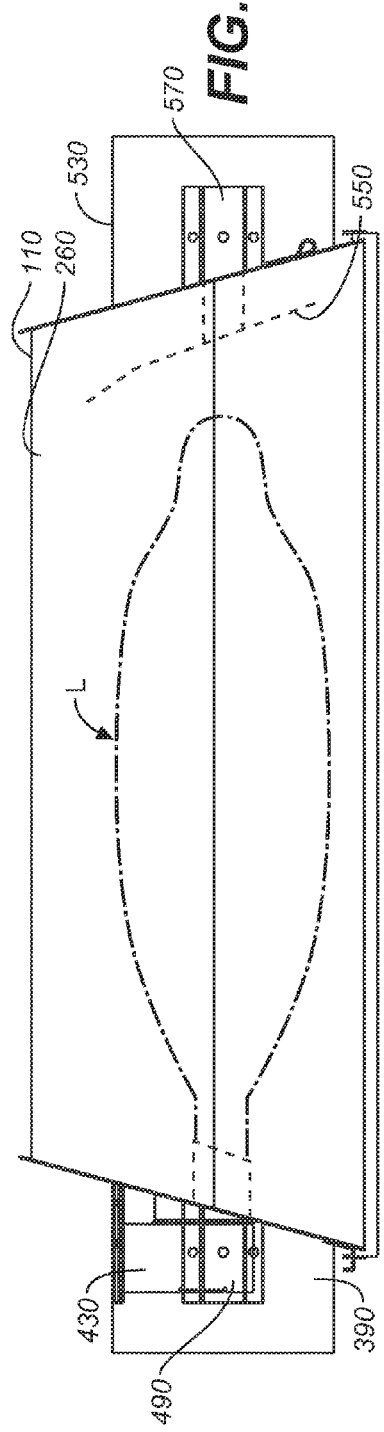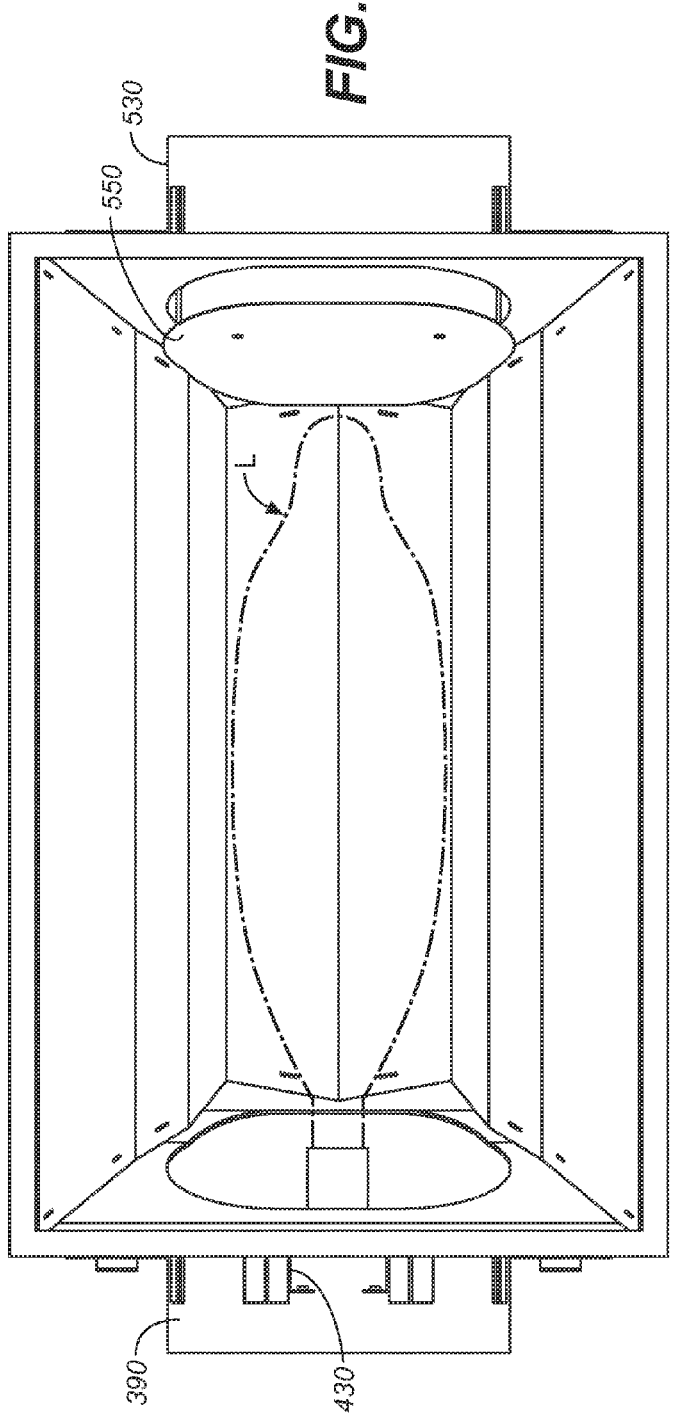

HORTICULTURAL LIGHT FIXTURE WITH ADJUSTABLE AIR CIRCULATION VENT HOLE COVER AND ADJUSTABLE LIGHT SOCKET ASSEMBLY

CROSS REFERENCES TO RELATED APPLICATIONS

The present application claims the benefit of U.S. Provisional Patent Application Ser. No. 61/053,631, filed May 15, 2008 (May 15, 2008).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to light fixtures, and more particularly to horticultural and agricultural lighting apparatus, and still more particularly to a horticultural light fixture using circulating air for cooling and having an adjustable vent hole cover for fine tuning cooling control according to the heat produced by the light bulb employed.

2. Discussion of Related Art Including Information Disclosed Under 37 CFR §§1.97, 1.98

U.S. Pat. No. 7,175,309 to Craw, et al, teaches a combination lighting and ventilating apparatus which includes a main housing with a ventilating inlet and a lighting outlet, a lamp housing recessed within the main housing, a lamp recessed within the lamp housing, and a fan positioned to draw air into and through a first opening of the lamp housing, around the lamp, and through a second opening in the lamp housing.

U.S. Pat. No. 6,595,662 Wardenburg discloses a grow light having an exterior shell with an air inlet and a hot air exhaust outlet, and a specular interior insertable into the shell. The sides of the specular insert are spaced apart from the walls of the shell so as to form a double-walled housing having air cooling chambers and vents which facilitate the movement and exhaust of air heated by high intensity light bulbs. The apparatus does not include the adjustable and/or removable vent covers characteristic of the present invention.

U.S. Pat. No. 6,435,699 to Glowach, Sr. et al, describes a high intensity light housing comprising a shell with an inner surface conforming generally to the lamp profile, except at the lamp face. The shell includes an air intake port and circulates air through an air space between the inner surface of the shell and the lamp. The air exits through an exhaust port. No adjustment device is described.

U.S. Pat. No. 6,247,830 to Winnett et al teaches an air-cooled light comprising a cylindrical transparent sleeve that shields heat generated by a high intensity discharge lamp from the surrounding environment. Sealingly disposed on each end of the transparent cylinder is an end plate and O-ring combination that insulates the interior of the cylinder from the external environment. Air flow through the sleeve and around the lamp within the cylinder is provided by air duct hose clamped to each end plate. However, as with the foregoing patents, no vent cover or adjustment means is shown.

U.S. Pat. No. 4,449,166 to Sharp describes a combination light and air ventilation fixture for suspended ceilings. The surrounding frame forms air supply and air exhaust ducts, but not air flow adjustment means is described in connection with the air supply.

The foregoing patents reflect the current state of the art of which the present inventors are aware. Reference to, and discussion of, these patents is intended to aid in discharging Applicants' acknowledged duties of candor in disclosing information that may be relevant to the examination of claims to the present invention, when such claims are presented in connection with a non-provisional patent application. However, it is respectfully submitted that none of the above-indicated patents disclose, teach, suggest, show, or otherwise render obvious, either singly or when considered in combination, the invention described herein.

BRIEF SUMMARY OF THE INVENTION

The present invention is an improved horticultural and agricultural light housing that includes an adjustable socket and adjustable air vents on its ends to accommodate different sized bulbs and to permit tight temperature regulation and some adjustment of the light reflected from the specular interior surface of the housing. It accomplishes these features through the use of adjustable reflective inserts that may be fully closed, such that the housing function as a conventional unvented hood, to being fully opened for maximum ventilation and some light loss. In between the fully closed and fully opened positions are a range of positions that will affect both the interior operating temperature and the light reflected out from the housing and toward plants.

It is therefore a first and principal object of the present invention to provide a new and improved plant grow light apparatus that prevents damage to plants by heat generated from grow lights.

Another object of the present invention to provide a new and improved lighting apparatus that prolongs lamp life by reducing temperatures in the immediate vicinity of the lamp.

A further object or feature of the present invention is a new and improved plant grow light housing that facilitates room temperature control through the use of light housing temperature control.

A still further object of the present invention is to provide a horticultural light housing that accommodates different sized bulbs while provide all of the above-indicated features.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 9 is a front view in elevation, showing a light source in phantom; and

FIG. 10 is a bottom view.

DETAILED DESCRIPTION OF THE INVENTION

Figure 1:
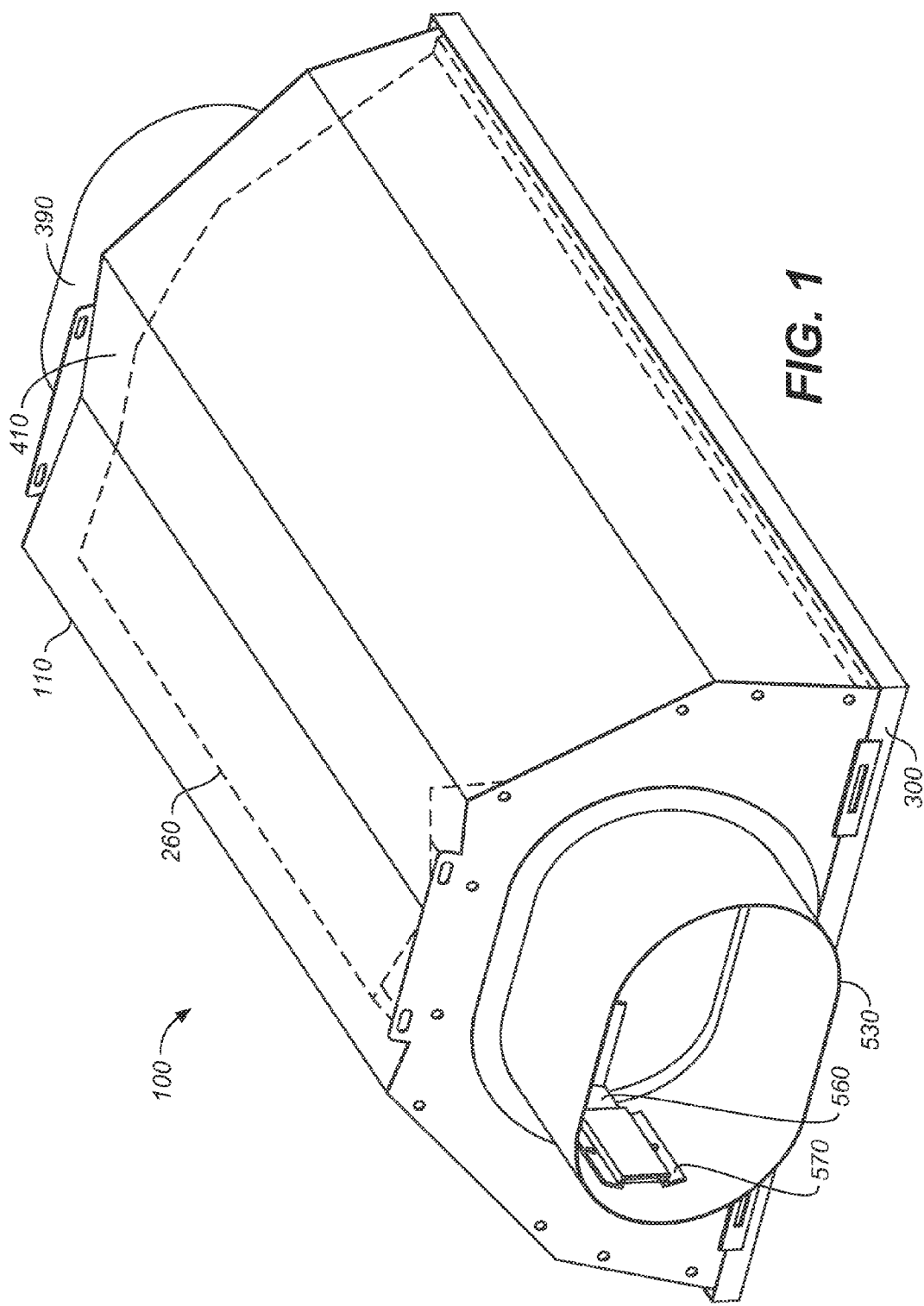
FIG. 1 is an upper right front perspective view showing the structural and functional elements comprising the horticultural light fixture of the present invention.
Figure 2:
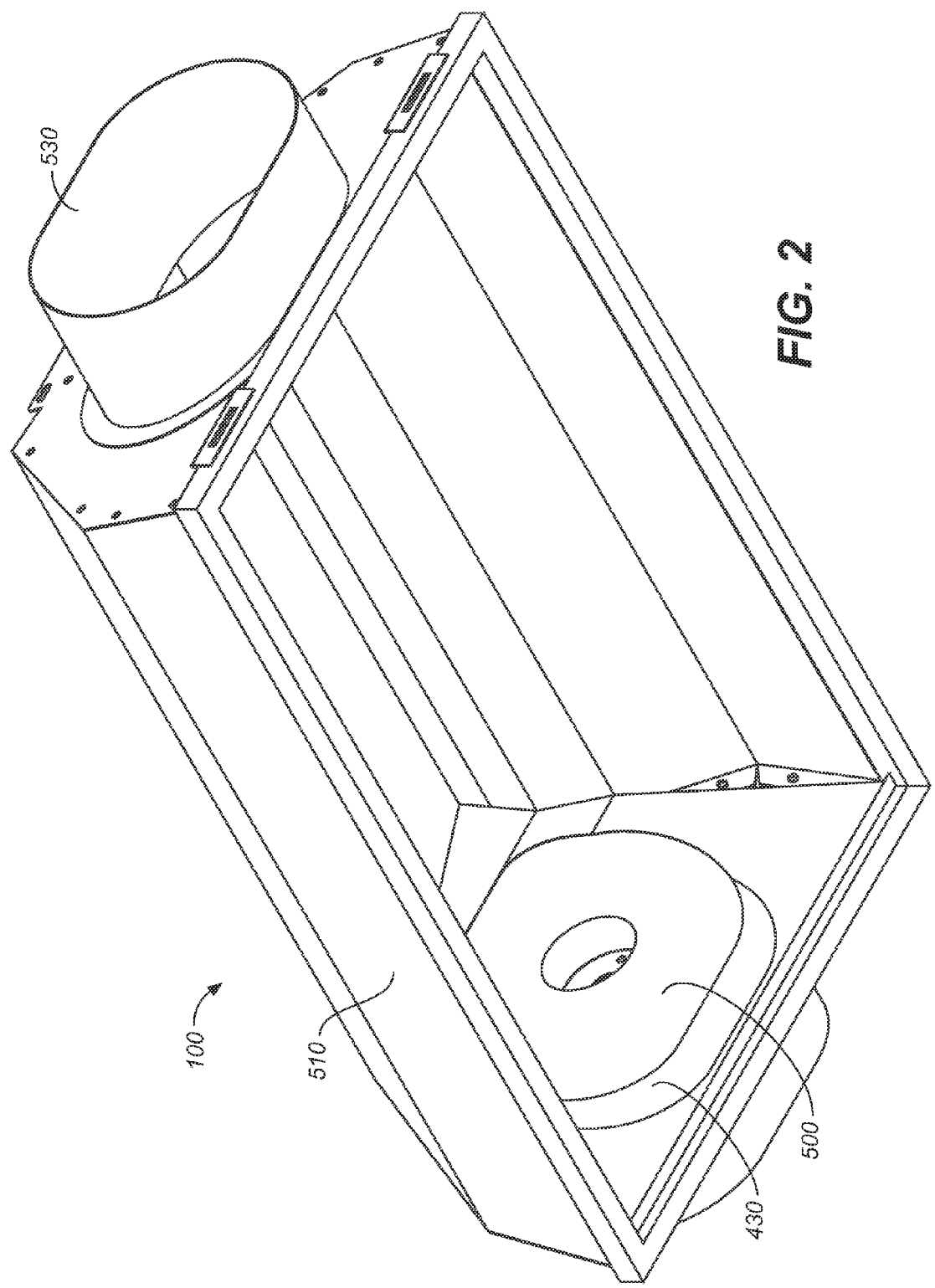
FIG. 2 is an upper left rear perspective view thereof.
Figure 3:
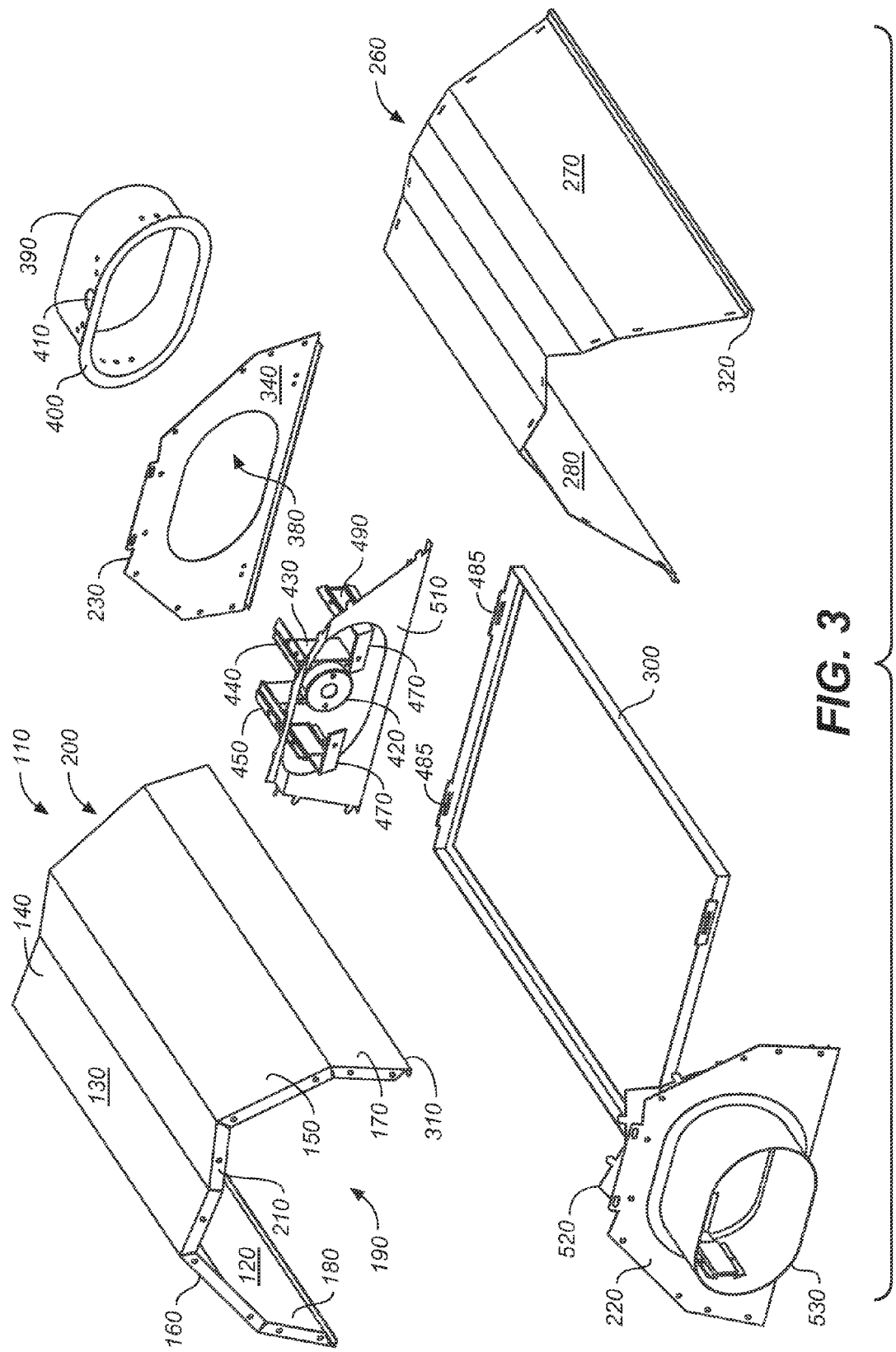
FIG. 3 is a partially exploded upper left rear perspective view thereof.
Figure 4:
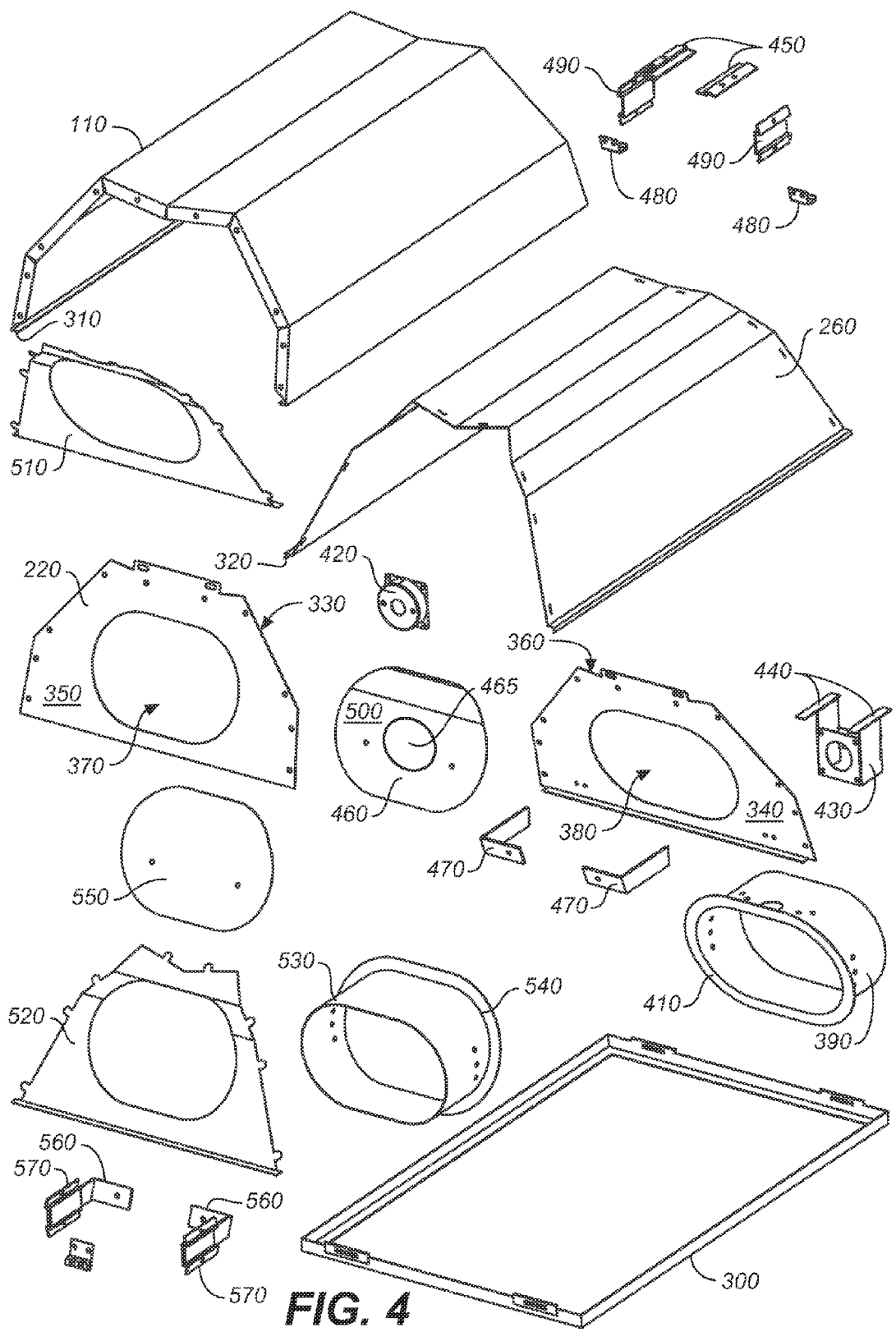
FIG. 4 is a fully exploded upper left rear perspective view of the apparatus of FIGS. 1-3.
Figure 5:
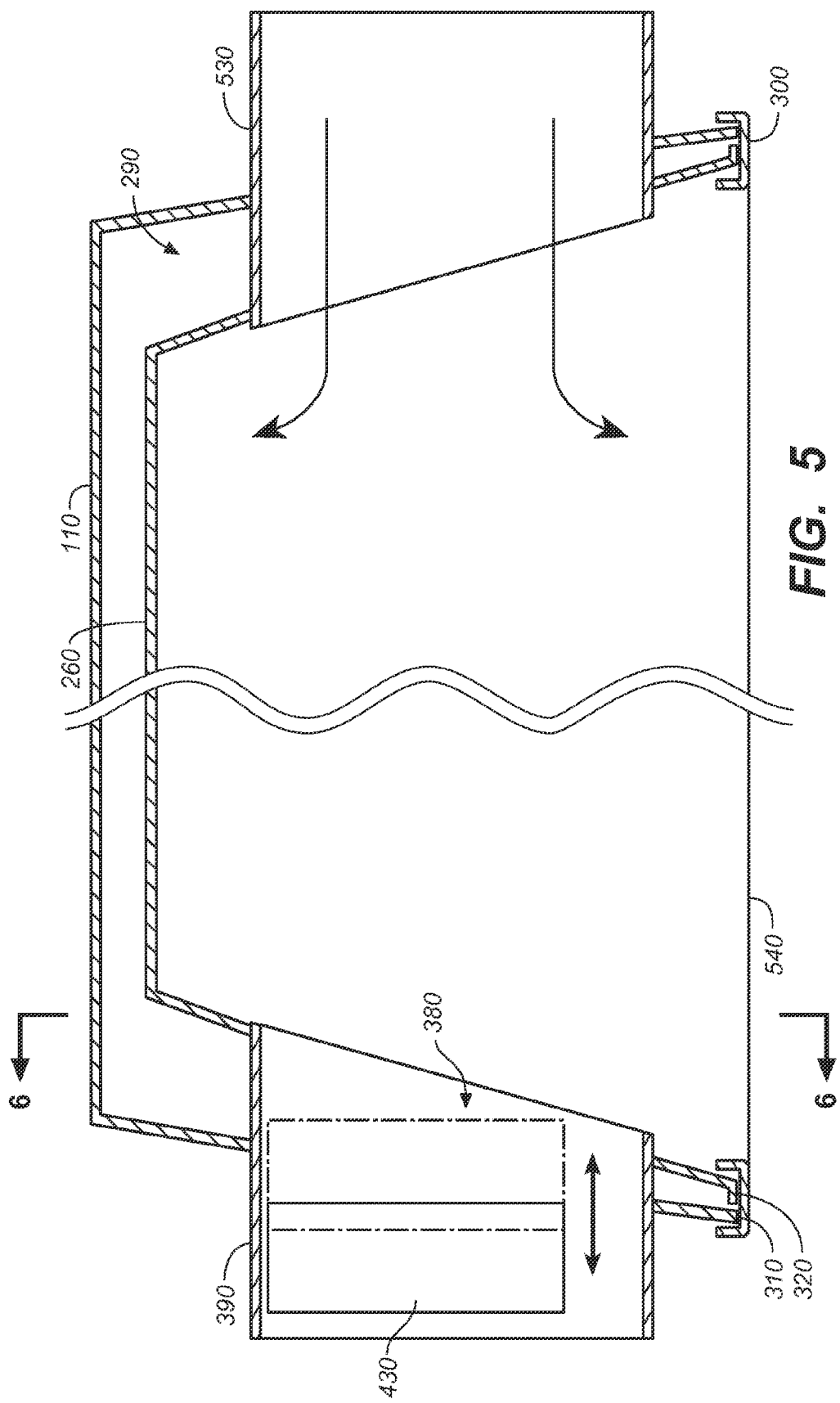
FIG. 5 is a cross-sectional front view in elevation taken along section line 5-5 of FIG. 6.
Figure 6:
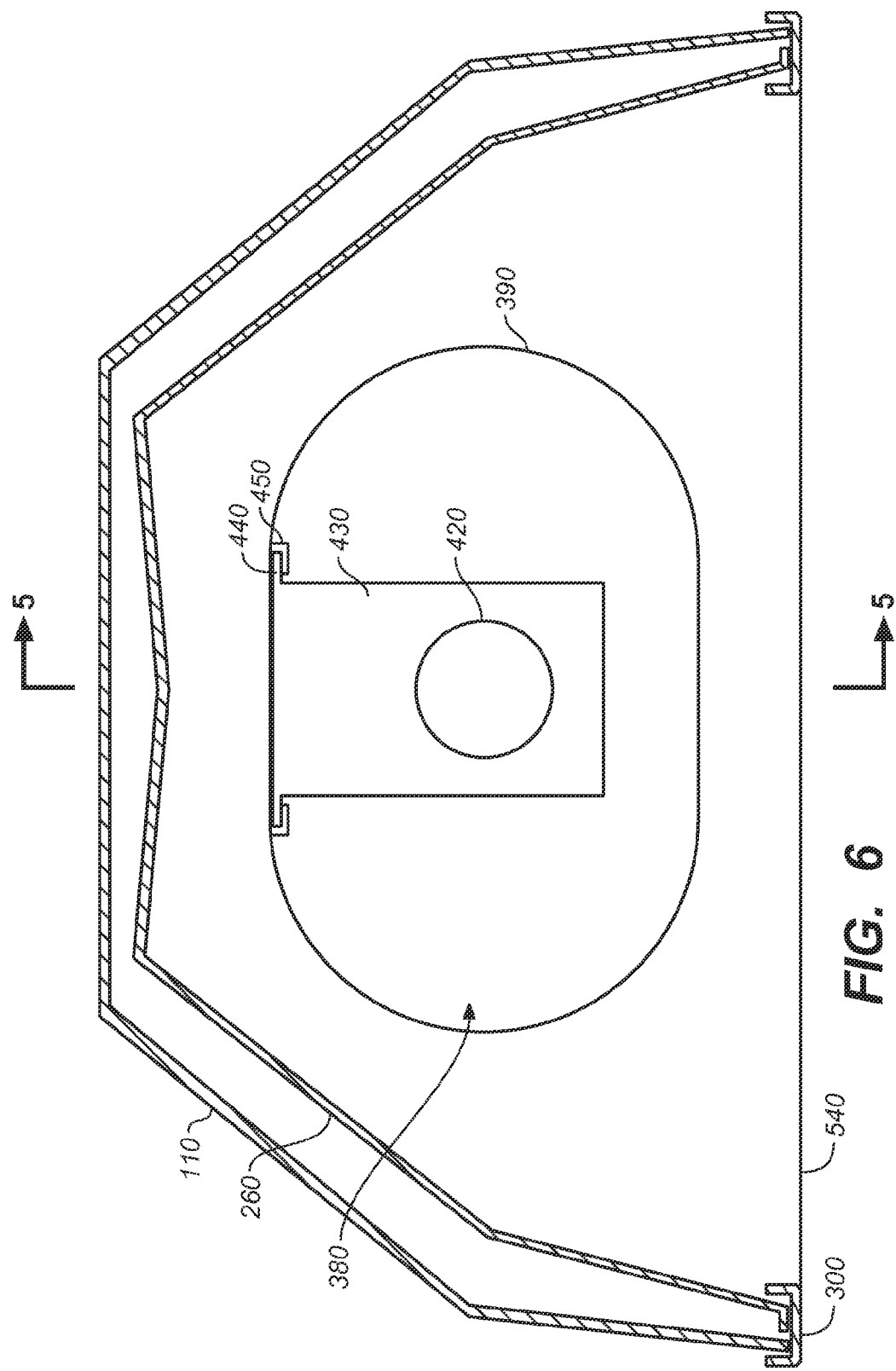
FIG. 6 is a cross-sectional end view taken along section line 6-6 of FIGS. 5, 7, and 8.
Figure 7:
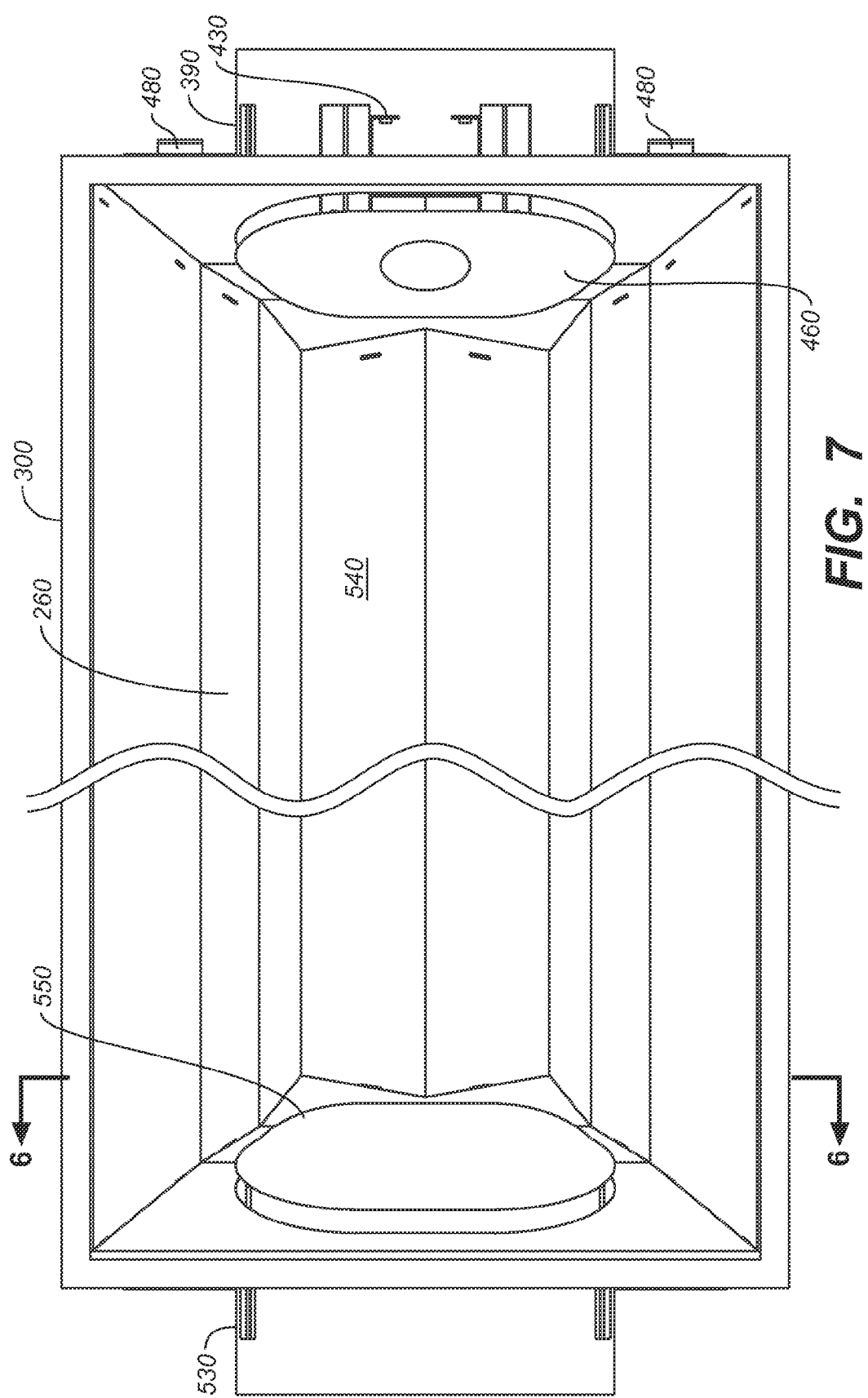
FIG. 7 is a bottom view.
Figure 8:
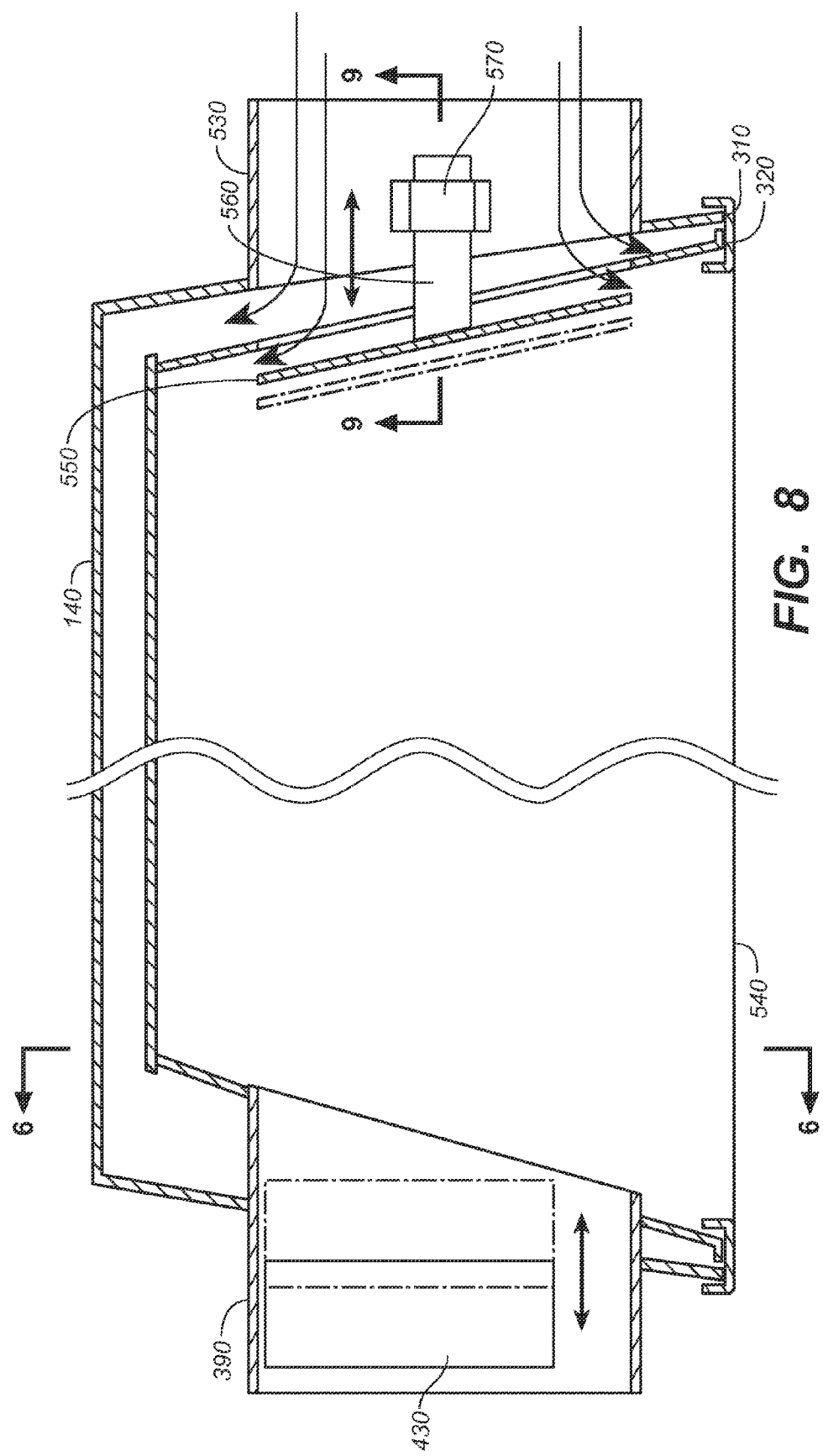
FIG. 8 is a cross-sectional end view, showing slidable adjustments possible in both the light socket and vent cover.

Referring to FIGS. 1 through 10, wherein like reference numerals refer to like components in the various views, there is illustrated therein a new and improved horticultural and agricultural light fixture having adjustable air cooling vent hole covers, the inventive apparatus generally denominated 100 herein. These figures illustrate the best mode of practicing the invention presently known by the inventors. Collectively, these views show that the inventive system comprises a fixture cover or housing 110 that includes an interior 120 and an exterior 130, a top side 140, first and second angled sides 150, 160, and first and second vertical sides 170, 180. The open ends 190, 200 of the housing include flanges 210 for the attachment of first and second end panels 220, 230, respectively. The connection means comprises tongue-and-slot or tab-and-slot connectors, though alternative means of myriad kinds will be envisioned by those with skill in the art.

Each of the end panels 220, 230, includes an interior side 240, 250, provided with specular material so as to contribute to the reflective properties of the overall interior specular configuration of the fixture While the shape of the housing illustrated comprises an elegant low profile suited for use in high volume environments, it should be understood that the invention does not reside in the relative dimensional features of the housing sides, top, ends, and the like. Rather, the housing in the illustrations is but one of many possible geometric configurations that would be suitable for incorporating the structural and operational elements of the air cooling apparatus of the present invention.

The inventive apparatus further includes a specular insert 260 having a plurality of sides which generally conform to and tracks the interior shape of the housing. The exterior of the sides include a non-reflective exterior surface 270, while the interior surfaces 280 of the sides are highly reflective. When the housing is assembled, a plurality of the sides of the specular insert are spaced slightly apart from the housing interior so as to provide a cooling and insulating airspace 290 between the insert and the housing.

The fixture next includes a base 300, comprising a rectangular L-shaped channel into which and upon which each of the housing and specular insert lower edges 310, 320, respectively, are disposed. The base is essentially a frame that defines the opening in the bottom of the light fixture.

The principal inventive aspects of the fixture shown and described herein reside most clearly in the structural and operational elements comprising the first and second ends of the fixture. Each end includes an assembly having as a first element an end panel 220, 230, noted above. Each end panel is shaped to enclose the combined housing and specular insert and has a reflective interior side 330, 340, and a non-reflective exterior side 350, 360. The end panels next include an oval opening 370, 380.

An oval duct connector 390, preferably a duct connector ring having a proximal flange 400 for engaging the interior side of end panel 230, is disposed around the oval opening of the end panel and extends outwardly from the exterior side of the end panel. The oval duct connector is shaped for connection to oval ducting in an air circulation system.

An adjustable light socket assembly is affixed to the upper portion of the interior side of the duct connector 390 and a power cord to the socket is fed through a hole 410 in the upper side of the oval duct connector. The light socket assembly includes a light socket 420, and a bracket 430 for securing and supporting the socket. The bracket includes upper flanges 440 that are slidably disposed in a track defined by spaced apart low profile parallel Z-bars 450. Thus, the light socket is slidably adjustable in the track and can be moved longitudinally, either closer to the interior of the fixture housing or further away. In this manner, the housing can accommodate larger or small light bulbs according to the needs of the user.

In a preferred embodiment, an adjustable vent hole cover 460 may also be slidably mounted in the duct connector affixed to the opening in the first end panel. The vent hole cover includes a hole 465 to accommodate the light socket and/or bulb L. Two L-bars 470 are affixed to the outer surface of the vent hole cover, and the outwardly projecting fingers of the L-bars are retained in channels 490 affixed to the interior sides of the duct connector 390. Brackets 480 affixed proximate the bottom of the end panel snap into slots 485 in the base to secure it between the specular insert 260 and the base. To contribute further to the reflector function, the vent hole cover preferably includes a specular interior surface 500.

Next, the end panel includes a specular end element 510 which completes the specular insert at one end. A second specular end element 520 accomplishes the same result at the other end.

The second end of the fixture also includes an end panel 220 with an oval opening 370 and an oval duct connector 530 having a flange 540 for engagement with the interior side of the end panel. The duct connector extends outwardly from the housing 110 for connection to an air system duct. However, the oval duct connector on the second end does not include a light socket, and therefore the vent hole cover 550 is a simple planar panel shaped to match the oval opening. As with the other vent hole cover, L-bars 560 are slidably mounted in opposing tracks 570 mounted on the sides of the connector 530.

Finally, a transparent lens 540 is placed into the base and thus over the bottom opening of the assembled fixture. This protects and encloses the light source (bulb) in a defined space, creates a controlled and enclosed air flow volume, and thus makes it possible to finely tune the air flow through the housing, around the specular insert, around the light and light socket, and in the environment immediately around the fixture.

In this manner, the inventive apparatus may be connected to an air circulation system having ducting suitably shaped for connection to the duct connectors. Air can be circulated from one end of the fixture, through the enclosed interior, and out the other end, and the rate and volume of air flow can be carefully controlled by adjusting one or both of the adjustable vent hole covers (ducts) by selectively opening them from fully closed positions to fully open positions, and thereby to ensure adequate cooling of the light source, thereby increasing safety in operation, comfort in the growing environment, and bulb life.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A light fixture, comprising:
    a fixture housing including an interior and an exterior, a top side, first and second angled sides, first and second vertical sides, and first and second open ends;
    first and second end panels disposed in said first and second open ends, respectively, each of said first and second end panels having a specular interior side, wherein at least one of said first and second end panels includes a duct opening;
    at least one duct connector disposed in said at least one duct opening, said at least one duct connector having an interior side;
    a specular insert inserted into the interior of said fixture housing and having sides with interior and exterior surfaces, said interior surfaces being highly reflective, and wherein when said light fixture is assembled, a plurality of said sides of said specular insert are spaced apart from said fixture housing interior so as to provide a cooling and insulating airspace between said specular insert and said fixture housing;
    a base on which each at least one of said fixture housing and said specular insert are mounted;
    a light socket assembly affixed to said interior side of said at least one duct connector, said light socket assembly including a light socket and a bracket for securing and supporting said light socket;
    a lens covering the opening in said base; and
    at least one adjustable vent hole cover mounted in said at least one duct connector and in the duct opening in said end panel, said at least one vent hole cover having a fully open position and a fully closed position, such that when said duct connector is connected to an air circulation system, the rate and volume of air flow to and within said interior of said light fixture can adjusted by adjusting the position of said at least one vent hole cover.

2. The light fixture of claim 1, wherein each of said first and second end panels includes a duct opening, a first duct connector disposed in the duct opening of said first end panel, and a second duct connector disposed in the duct opening of said second end panel, each of said duct connectors having an interior side.

3. The light fixture of claim 2, further including a first vent hole cover mounted in said first duct connector and a second vent hole cover mounted in said second duct connector.

4. The light fixture of claim 3, wherein said light socket assembly is an adjustable light socket assembly affixed to said interior side of one of said first and second duct connectors.

5. The light fixture of claim 4, wherein said light socket bracket slideably captures said light socket, and wherein said light socket adjusts longitudinally to bring a light source selectively closer or further away from said interior of said light fixture.

6. The light fixture of claim 1, wherein said light socket assembly is an adjustable light socket assembly affixed to said interior side of one of said first and second duct connectors.

7. The light fixture of claim 6, wherein said light socket bracket slideably captures said light socket, and wherein said light socket adjusts longitudinally to bring a light source selectively closer or further away from said interior of said light fixture.

8. The light fixture of claim 1, wherein said at least one vent hole covers includes a specular interior side.

\* \* \* \* \*